United States Patent [19]

Erickson et al.

[11] 4,129,044
[45] Dec. 12, 1978

[54] VARIABLE GEAR RATIO CHAIN DRIVE SYSTEM FOR BICYCLES

[76] Inventors: Marlo W. V. Erickson, 12024 Kling St. 104 North Hollwood, Calif. 91607; Stanley W. Volk, 3441 Calle Vistosa, Tucson, Ariz. 85715

[21] Appl. No.: 798,410

[22] Filed: May 19, 1977

[51] Int. Cl.² ............... F16H 55/12; F16H 55/30; F16H 55/52; F16H 55/54
[52] U.S. Cl. ............... 74/244; 74/230.18; 74/230.21; 280/236; 74/217 B
[58] Field of Search ........... 74/244, 217 B, 217 C, 74/217 CV, 217 S, 230.18, 230.2, 230.22, 230.21, 230.23; 280/236, 238

[56] References Cited

U.S. PATENT DOCUMENTS

| | | | |
|---|---|---|---|
| 395,816 | 1/1889 | Dustin | 74/230.21 |
| 498,613 | 5/1893 | Black et al. | 74/230.21 |
| 563,399 | 7/1896 | Musgreave | 74/230.21 |
| 792,220 | 6/1905 | Johnston | 74/244 |

FOREIGN PATENT DOCUMENTS 426805  7/1911  France ............... 74/230.20

*Primary Examiner*—Samuel Scott
*Assistant Examiner*—William R. Henderson
*Attorney, Agent, or Firm*—Cahill, Sutton & Thomas

[57] ABSTRACT

A finite range infinitely variable gear ratio chain drive system incorporates a drive sprocket assembly having a plurality of radially displaceable sprocket gears. Each of the sprocket gears is mounted upon a shaft extending intermediate two spaced apart plates. Each shaft has a unique degree of radial displacement and twist intermediate the plates which are, respectively, commensurate with the finite range of effective diametric excursion and resulting change in effective circumference of the drive sprocket assembly. The effective diameter of the drive sprocket assembly is variable by translating the drive sprocket intermediate the fixed plates and forcing the sprocket gears to extend to contract radially along their respective shafts.

17 Claims, 6 Drawing Figures

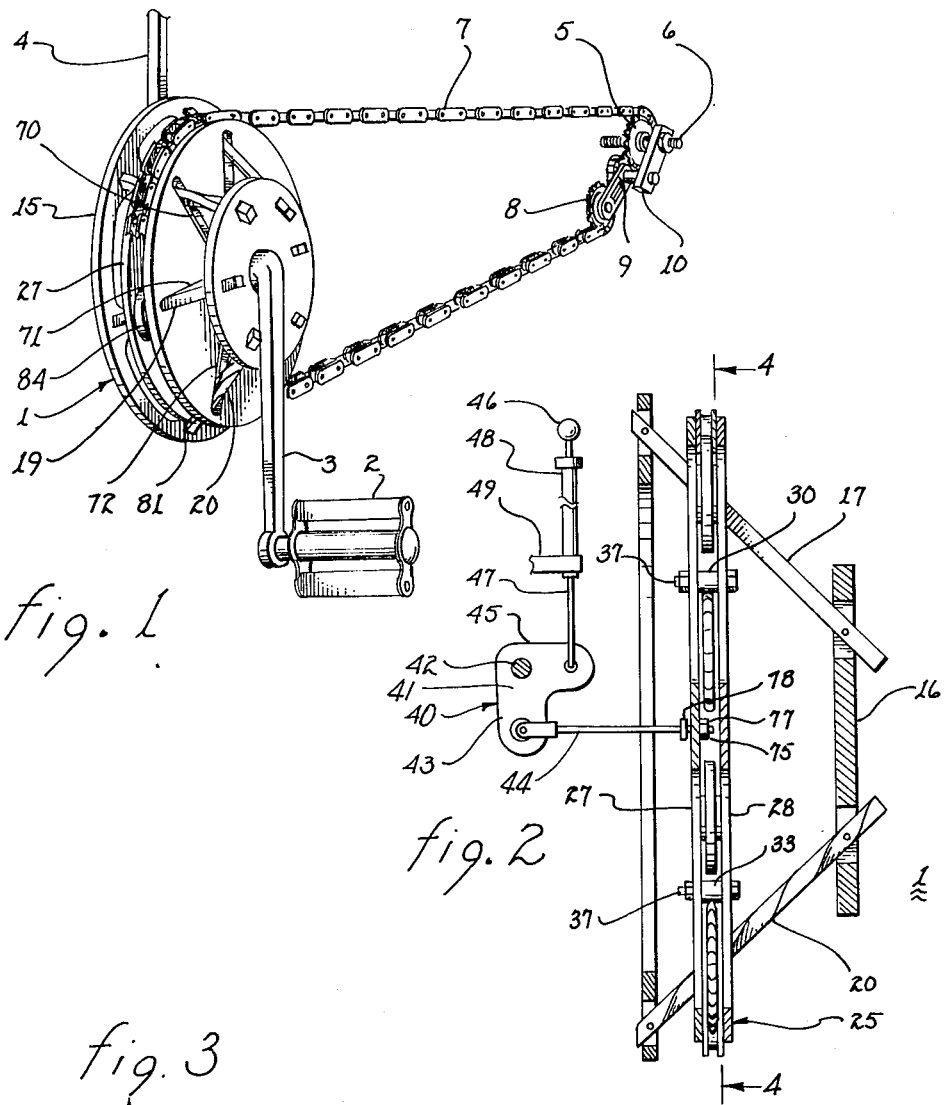
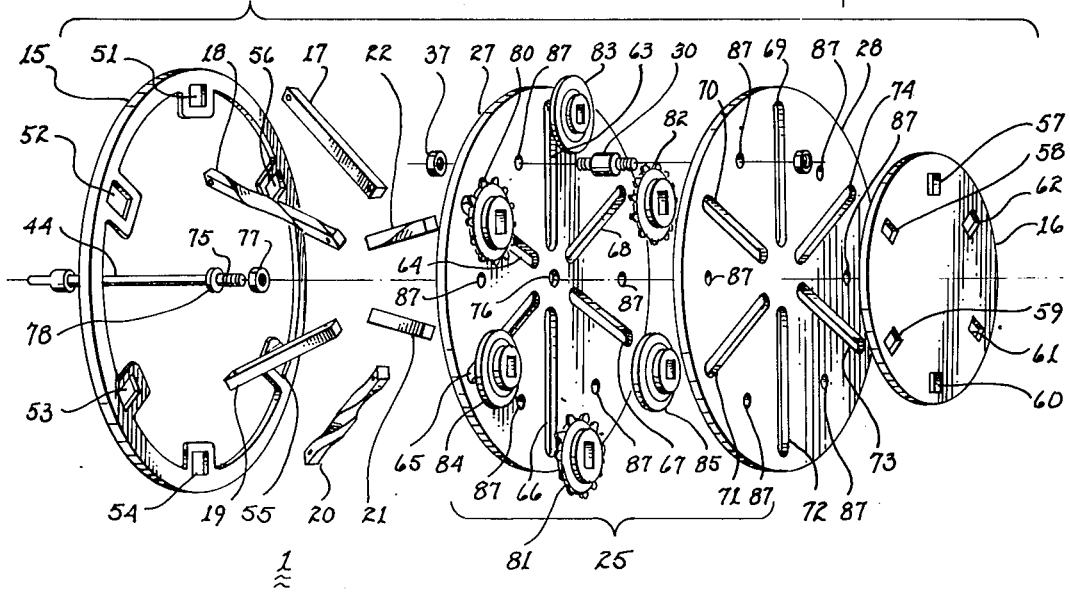

VARIABLE GEAR RATIO CHAIN DRIVE SYSTEM FOR BICYCLES

The present invention relates to chain drive systems and, more particularly, to chain drive systems having variable gear ratios.

Conventional bicycles having a plurality of selectable gear ratios employ either a gear box disposed within the hub of the rear wheel or a plurality of selectable differently sized sprockets incorporated in the chain drive system. With respect to the present invention, only the latter type of system is of import. To vary the gear ratio between the drive sprocket and the rear axle sprocket, a derailer type mechanism is employed which alters the engagement of the chain from one sprocket to another sprocket. Such a system has several disadvantages. First, only a predetermined finite number of gear ratios are available. Second, in a change from one gear ratio to another, each of any intermediate gear ratios must be sequentially engaged and disengaged. Third, the process of changing gears requires "de-railing." Fourth, it is time consuming to consecutively engage each gear intermediate to the selected gear. Fifth, jamming often occurs if changes in gear ratio are rapidly stepped through a number of intermediate gears.

In an attempt to overcome the above problems attendent multi-gear ratio chain drive systems, various plural expansible sprocket gear systems have been developed. U.S. Pat. No. 607,322 describes a sprocket wherein each of the teeth are mounted upon a shaft, the lower end of which is translatable within a curved slot such that the spacing intermediate adjacent teeth is maintained commensurate with the links of the chain while simultaneously the circumference defined by the plurality of teeth is varied. U.S. Pat. No. 2,584,447 illustrates a variable drive sprocket wherein a plurality of sprocket gears are mounted upon independent arms, which arms are resiliently flexible to vary the overall perimeter of the drive sprocket inversely commensurate with the force applied at the driving pedals. U.S. Pat. No. 3,798,989 shows a variable diameter drive sprocket wherein two toothed semicircular sprocket elements are displaceable with respect to one another to vary the overall perimeter. U.S. Pat. No. 3,913,410 describes a drive sprocket developed from a plurality of sprockets gears independently mounted upon pivotable arms, which arms accommodate a change in effective perimeter and the necessary variable spacing intermediate adjacent sprocket gears.

With respect to pulley and belt systems wherein the diameter of the driving pulley is alterable, U.S. Pat. Nos. 742,497 and 3,935,751 are of interest. In these patents, a plurality of belt receiving channel sections are radially extendible and contractible to vary the effective perimeter. Because belts, rather than chains are employed, the meshing problems attendant sprockets and chains need not be of consideration.

U.S. Pat. Nos. 724,450 and 740,829 disclose variable diameter sprocket assemblies wherein each of a plurality of sprocket gears are simultaneously radially displaceable to alter the effective curcumference of the drive sprocket. Because no means are described which accommodate the chain and sprocket meshing requirements as the circumference is varied, a serious question arises as to whether the mechanisms illustrated and described in these patents are in fact operative.

The present invention is directed to a chain drive sprocket system which includes a sprocket gear assembly of a plurality of radially positionable sprockets gears, each of which engages the chain and imparts a driving force to the chain. Each of the sprocket gears are slidably mounted upon shafts extending intermediate two supporting plates, which shafts, in totality, define a frusto-conical geometric configuration. By shifting the sprocket gears en masse along the respective shafts, the effective circumference defined by the sprocket gear assembly is either reduced or increased. Such a change in circumference with respect to the circumference of the driven sprocket changes the gear ratio therebetween, as is well known. To accommodate meshing of the sprocket gears with the chain as the spacing intermediate adjacent sprocket gears is varied, the sprocket gears are rotated relative to one another through the twist of the sprocket gear supporting shafts. In operation, a change in gear ratio of the chain drive system is effected by translating the sprocket gear assembly along the respective sprocket gear shafts between the supporting plates.

It is therefore a primary object of the present invention to provide a finite range infinitely variable drive sprocket assembly.

Another object of the present invention is to provide a chain drive system for bicycles having a variably gear ratio drive train.

Yet another object of the present invention is to provide a variable gear ratio drive sprocket interchangeable with conventional drive sprockets in bicycles.

Still another object of the present invention is to provide a rapid gear change capability for sprocket and chain driven bicycles.

A further object of the present invention is to provide a variable gear ratio system for bicycles which obviates the need for pedaling during gear changes.

A yet further object of the present invention is to provide a variable circumference drive sprocket which is in continuous mesh with a driven chain.

A still further object of the present invention is to provide a variable circumference drive sprocket assembly having a plurality of sprocket gears rotatable with respect to one another upon a change in circumference of the assembly.

These and other objects of the present invention will become apparent to those skilled in the art as the description thereof proceeds.

The present invention may be described with greater specificity and clarity with reference to the drawings, in which:

FIG. 1 is a perspective view of a sprocket and chain drive system incorporating the present invention.

FIG. 2 is a cross-sectional view of the drive sprocket assembly and attendant mounting plates.

FIG. 3 is an exploded pictorial view of the elements illustrated in FIG. 2.

Figure 4:
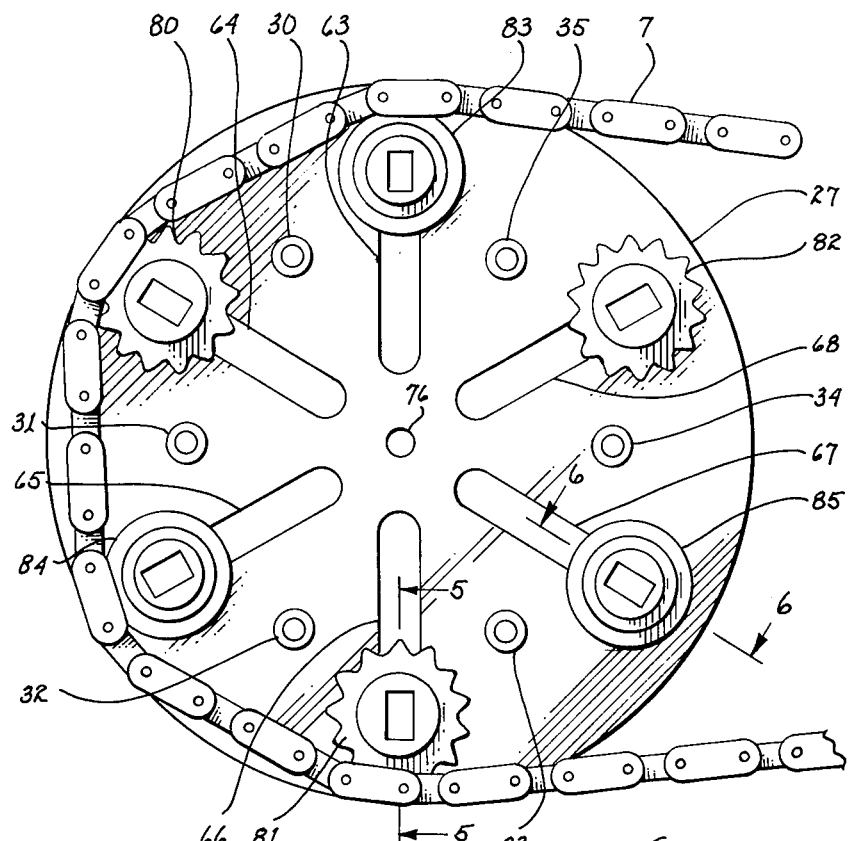
FIG. 4 is a side view of the drive sprocket assembly, taken along lines 4—4, as shown in FIG. 2.

Referring to FIG. 1, there is illustrated a chain drive assembly particularly configured for use in bicycles. A drive sprocket system 1 is turned in response to a force imparted by the bicycle pedals (of which pedal 2 is illustrated) and attached arms 3, 4. The drive sprocket system itself and the shaft interconnecting arms 3 and 4 are rotatably secured to the frame of the bicycle by any one of several methods known to those skilled in the art. Drive sprocket system 1 drives a follower sprocket 5 secured to rear axle 6 through a chain 7. Spring loaded tensioning idler sprockets (or idlers) 8 and 9 are employed to take up automatically the slack in chain 7 commensurate with a change in gear ratio. Spring mechanism 10, shown figuratively, may be of conventional construction.

Referring jointly to FIGS. 1 and 2, the major elements of drive sprocket system 1 and their interrelationships will be reviewed. Base plate 15, in combination with end plate 16, fixedly each of a plurality of shafts 17–22, these shafts, in toto, define a frusto-conical-like section. A sprocket assembly 25 is penetrably mounted upon each of shafts 17–22 and is slidably displaceable from a first position adjacent base plate 15 to a second position adjacent end plate 16. The sprocket assembly includes a first retaining plate 27 spatially displaced from a second retaining plate 28 by a plurality of spacers 30–35 (of which spacers 30 and 33 are illustrated in FIG. 2). Each of these spacers are secured intermediate and retained in place by nut and bolt assemblies 37. Plates 27 and 28, in spaced relationship with respect to one another, support a plurality of sprocket gears and idlers whch engage chain 7. Necessarily, the spacing intermediate plates 27 and 28 must be sufficient to accommodate the width of chain 7. Each of the sprocket gears and idlers are slidably mounted upon one of shafts 17–22 in such a manner as to accommodate sliding movement along the longitudinal axis of the shafts without permitting rotation about the shafts.

The positional relationship of sprocket assembly 25 intermediate base plate 15 and end plate 16 is controlled by a linkage mechanism generally identified with reference numeral 40. The linkage mechanism includes a bellcrank 41 pivotally mounted upon a pin 42. Arm 43 is operatively engaged with sprocket assembly 25 through a push rod 44. Arm 45 of the bellcrank is operatively engaged with a manually actuated knob 46 through a stiff cable 47, which cable is partially enclosed within sheath 48 rigidly secured to the chassis of the bicycle by means of brackets such as bracket 49; in the alternative, cable 47 may be replaced by a rigid push rod or similar rigid linkages which translate both a push and pull action of knob 46 to arm 45. Other well known actuating mechanism can also be employed.

The operative relationships of the sprocket gears, idlers, first and second retaining plates, shafts, base plate and end plate will be described with primary reference to FIG. 3. One end of shafts 17–22 are pinned into apertures 51–56, respectively, in base plate 15; or, the shafts may be welded or otherwise affixed to the base plate. Similarly, the other ends of the shafts are pinned or otherwise affixed to end plate 16 at locations indicated by apertures 57–62. Plate 27 includes a plurality of radially oriented slots 63–68 through which shafts 17–22, respectively, extend. Plate 28 includes a plurality of similar slots 69–74 in alignment with the slots in plate 27 and through which the respective shafts extend. Thereby, support for translatory movement of sprocket assembly 25 intermediate base plate 15 and end plate 16 is provided by the shafts. Sprockets 80, 81 and 82 positionally cooperate with pairs of slots 64 and 70, 66 and 72 and 68 and 74, respectively; idlers 83, 84 and 85 positionally cooperate with pairs of slots 63 and 69, 65 and 71 and 67 and 73, respectively. Each of these sprockets and idlers includes laterally disposed shoulders for maintaining its position centered intermediate plates 27 and 28. Further, each of the sprockets and idlers is centrally apertured to slidably receive its respective shaft. The cross-sectional configuration of each of the apertures in the sprockets and idlers mates with that of the respective shaft to accommodate sliding movement along the longitudinal axis of the shaft but precludes rotation independent rotation of the shaft. Plates 27 and 28 are maintained in spaced apart relationship with one another by a plurality of spacers (of which spacer 30 is illustrated in FIG. 3) mounted upon nut and bolt assemblies (of which assembly 37 is illustrated in FIG. 3). The locations of these spacers are represented by mounting holes 87 in both plates 27 and 28. Push rod 44 of linkage mechanism 40 includes a threaded end 75 for penetrating engagement through aperture 76 in plate 27; a nut 77 threadedly engaging end 75 draws the plate into locking engagement with flange 78.

Figure 6:
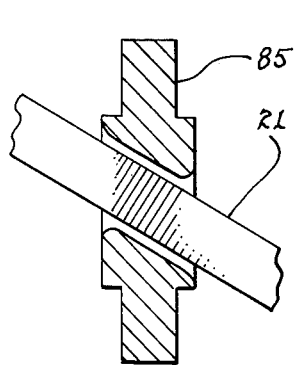
FIG. 6 is a cross-sectional view of an idler taken along lines 6—6, as shown in FIG. 4.
Figure 5:
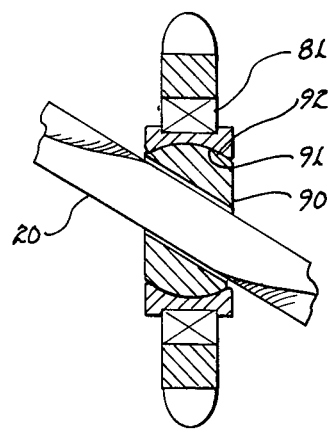
FIG. 5 is a cross-sectional view of a sprocket gear taken along lines 5—5, as shown in FIG. 4.

Referring jointly to FIGS. 4, 5 and 6, further details of the sprocket gears and idlers will be discussed. The orientation of the apertures within the idlers, such as idler 85, is biased with respect to the plane of the sprocket gear at an angle commensurate with the angle of the shafts with respect to the retaining plates. Thereby, the idlers are maintained in alignment with the follower sprocket 5 (see FIG. 1). Each sprocket, such as sprocket 81, includes an apertured bushing 90, the aperture of which is oriented at an angle commensurate with that of the supporting shaft. The exterior surface 91 of the bushing is convex and mates with a concave surface 92 within the sprocket. Thereby, sprocket 81 is pivotally movable with respect to the supporting shaft. Such pivotal movement of the sprockets is preferable in that it accommodates and relieves laterally oriented stresses upon chain 7 during rapid translation of the sprocket gear assembly intermediate base plate 15 and end plate 16. Obviously, the idlers may also be pivotally mounted in the manner described above with respect to sprocket 81.

Whenever the positional relationship between sprocket assembly 25 intermediate base plate 15 and end plate 16 is changed, the sprocket gears will be radially displaced. Such radial displacement necessarily varies the distance between adjacent sprocket gears. Since the chain is composed of a plurality of links of fixed length, the changing distance intermediate adjacent sprocket gears will preclude continuous meshing of the sprocket gears with the chain unless the sprocket gears are rotationally reoriented with respect to one another to accommodate the fixed link length. The rotational repositioning of the sprocket gears is accomplished by mounting the sprocket gears upon twisted shafts. Since the sprocket gears are non-rotatable independent of the respective shafts, translation of a sprocket gear along a twisted shaft will result in rotation of the sprocket gears. By having the shaft of any selected sprocket gear twisted to an amount which will result in rotation of the sprocket gear to a degree sufficient to accommodate the change length of the sprocket gear engaged section of the chain and by having the shafts supporting the remaining sprocket gears twisted by an amount proportional thereto, all of the sprocket gears will always mesh with the chain regardless of the position of the sprocket assembly intermediate the base plate and the end plate. For illustrative purposes, shaft 20 is depicted with the maximum degree of twist while shafts 18 and 22 are depicted as having proportionally lesser twist. It is unnecessary to include any twist in the shafts supporting the idlers as the latter support but do not mesh with the chain.

In operation, a changing gear ratio between drive sprocket system 1 and follower sprocket 5 is effected by repositioning sprocket assembly 25 toward or away from base plate 15. Such repositioning will force the sprocket gears and the idlers to define points along a larger or smaller radius circle. The repositioning is effected by either pulling or pushing upon knob 56 which results in translation of linkage 45 to draw plate 27 toward or away from base plate 15. Simultaneous with any translation of sprocket assembly 25 along the supporting shafts, the sprocket gears will rotate with respect to one another in accordance with the degree of twist of the supporting shafts and thereby maintain the sprocket gears in mesh with the chain despite a change in the effective diameter or circumference of sprocket assembly 25.

Because only one of the sprocket gears is mounted in a manner which will accommodate the full extent of the change in length of the engaged portion of chain 7, it is mandatory that whenever any change in gear ratio be effected that this sprocket be positioned at a point wherefrom the slack of the chain extends. That is, a change in gear ratio is physically impossible should a sprocket gear which undergoes less than the maximum twist be in mesh with the chain intermediate the maximum rotating sprocket gear and the slack part of the chain. To insure compliance with this requirement, the left pedal can be oriented with respect to the end plate such that it is to be maintained at its lowermost position whenever a gear ratio change is to be effected.

As may be apparent, the translation of driving force from the pedals to the chain is effected as follows. The torque applied to arms 3 and 4 is transferred to end plate 16 since both the arms and the end plate are rigidly attached to a common axle rotatably mounted on the bicycle. Rotation of the end plate results in rotation of shafts 17-22 about the axle. Necessarily, rotation of the shafts brings about a commensurate rotation of the sprocket assembly 25 which is in mesh with chain 7. Although base plate 15 is not shown attached to the axle intermediate the arms for the pedals, such attachment can be readily effected to more rigidly mount the shafts with respect to the axle.

While the principles of the invention have now been made clear in an illustrative embodiment, there will be immediately obvious to one skilled in the art many modifications of structure, arrangement, proportions, elements, materials and components, used in the practice of the invention which are particularly adapted for specific environments and operating requirements without departing from those principles.

We claim:

1. A finite range infinitely variable gear ratio chain sprocket for transmitting a driving force to a driven sprocket via a chain, said drive sprocket comprising in combination:
   a. spaced apart base and end plates mounted on a common axis of rotation for translating the driving force to said drive sprocket;
   b. a plurality of shafts, selected ones of which are twisted about their longitudinal axis for interconnecting said base plate with said end plate, each of said plurality of shafts having one end connected to said base plate closer to the axis of rotation than the other end connected to said end plate, whereby said plurality of shafts en toto resemble a frusto conical section;
   c. a plurality of sprocket gears for meshing with the chain, each of said sprocket gears being mounted upon one of said plurality of shafts;
   d. twist means for limiting rotation of each of said sprocket gears about the respective one of said plurality of shafts;
   e. plate means for maintaining said shaft mounted sprocket gears in a common plane, said plate means including means for accommodating travel of said plate means intermediate said base and end plates; and
   f. linkage means for repositioning said plate means intermediate said base and end plates to relocate said sprocket gears along respective ones of said plurality of shafts;

whereby, the circumference of said drive sprocket is variable by shaft induced radial movement of said sprocket gears with respect to the axis of rotation of said drive sprocket to alter the gear ratio between said drive sprocket and the driven gear and rotation of said sprocket gears relative to one another through said twist means and maintains said sprocket gears in mesh with the links of the engaged chain.

2. The drive sprocket as set forth in claim 1 wherein said plate means comprises a pair of adjacent plates for receiving said sprocket gears therebetween.

3. The drive sprocket as set forth in claim 2 including slots disposed within said plate means for receiving said plurality of shafts.

4. The drive sprocket as set forth in claim 2 wherein one of said twist means is proportional of the maximum change in length of the chain engaging drive sprocket circumference during travel of said plate means from a position adjacent said base plate to a position adjacent said end plate.

5. The drive sprocket as set forth in claim 4 wherein the remaining ones of said twist means are less than said one twist means in proportion to their circumferential displacement in one direction from said one twist means; whereby, the sprocket gear mounted on said one twist means accommodates the change in length of the drive sprocket engaged portion of the chain and the sprocket gears mounted on said remaining ones of said twist means proportionally accommodate the change in length of the drive sprocket engaged portion of the chain to continuously maintain the chain in mesh upon a change in gear ratio.

6. The drive sprocket as set forth in claim 5 wherein each of said twist means comprises a twisted shaft.

7. The drive sprocket as set forth in claim 6 including idlers mounted upon further selected ones of said plurality of shafts for supporting the chain intermediate said sprocket gears.

8. The drive sprocket as set forth in claim 7 wherein said twist means are not included in the idler supporting ones of said plurality of shafts.

9. The drive sprocket as set forth in claim 1 including idlers mounted upon further selected ones of said plurality of shafts for supporting the chain intermediate said sprocket gears.

10. The drive sprocket as set forth in claim 9 wherein each of said twist means comprises a twisted shaft.

11. The drive sprocket as set forth in claim 10 wherein said twist means are not included in the idler supporting ones of said plurality of shafts.

12. In a pedal powered vehicle having a chain driving a sprocket mounted on the axle of one wheel, a finite range infinitely variable gear ratio drive sprocket, said drive sprocket comprising in combination:
 a. base and end plates operatively connected to the pedals for imparting a force from the pedals to said drive sprocket, said base and end plates being located upon a common axis of rotation with each other and the pedals;
 b. a plurality of shafts extending intermediate said base and end plates, said plurality of shafts being radially oriented about the axis of rotation of said base and end plates and resembling a frusto-conical section having a base in proximity to said base plate and a top in proximity to said end plate;
 c. a plurality of sprocket gears for imparting the rotational force of said drive sprocket to the chain, each of said sprocket gears being mounted upon and slidable along the longitudinal axis of one of said plurality of shafts;
 d. twist means for regulating relative rotation between a mounted one of said sprocket gears and the corresponding one of said plurality of shafts on longitudinal translation of said mounted sprocket gears along the respective one of said plurality of shafts, said twist means being unrestrictive of movement of said mounted sprocket gear along the longitudinal axis of the respective one of said plurality of shafts;
 e. plate means for maintaining said plurality of sprocket gears in planar alignment intermediate said base and end plates; and
 f. linkage means for translating said plate means intermediate said base and end plates;

whereby, translation of said plate means translates said plurality of sprocket gears along respective ones of said plurality of shafts and produces radial displacement of said sprocket gears with respect to the axis of rotation and translation of said plate means alters the length of the chain engaged periphery of said drive sprocket with commensurate rotation of said sprocket gears imparted by said twist means to insure continuing mesh with the chain.

13. The drive sprocket as set forth in claim 12 wherein said twist means is different for each of the selected ones of said plurality of shafts.

14. The drive sprocket as set forth in claim 13 wherein the degree of twist imparted to the selected one of said twist means is serially proportionally reduced from the maximum degree embodied in one of said plurality of shafts to a minimum degree embodied in another of said plurality of shafts.

15. The drive sprocket as set forth in claim 14 including idlers mounted upon further selected ones of said plurality of shafts for supporting the chain intermediate said sprocket gears.

16. The drive sprocket as set forth in claim 15 wherein said twist means are not included in the idler supporting ones of said plurality of shafts.

17. The drive sprocket as set forth in claim 16 wherein each of said twist means comprises a twisted shaft.

* * * * *